United States Patent [19]
Montagne

[11] 3,763,911
[45] Oct. 9, 1973

[54] TIRE TREAD WITH PROTRUDING ELEMENTS BETWEEN ADJACENT RIBS

[75] Inventor: Jean Bernard Montagne, Cebazet, France

[73] Assignee: Compagnie Generale Des Etablissements Michelin raison sociale Michelin & Cie, Clermont-Ferrand, France

[22] Filed: Dec. 8, 1971

[21] Appl. No.: 205,821

[30] Foreign Application Priority Data
Dec. 24, 1970 France .............................. 7046762

[52] U.S. Cl. ............................................ 152/209 R
[51] Int. Cl. ............................................ B60c 11/06
[58] Field of Search ................................. 152/209 R

[56] References Cited
UNITED STATES PATENTS

| | | | |
|---|---|---|---|
| 2,264,767 | 12/1944 | Ofensend ........................ | 152/209 R |
| 2,843,172 | 7/1958 | Berry et al. ..................... | 152/209 R |
| 3,030,998 | 4/1962 | Jensen............................ | 152/209 R |

Primary Examiner—James B. Marbert
Attorney—Granville M. Brumbaugh et al.

[57] ABSTRACT

A tire tread is formed with protruding elements between adjacent ribs. At least the center rib is undercut so that its width decreases with increasing distance from the surface of the tread in a direction towards the axis of the tire. By virtue of the protruding elements, the width of the groove on either side of the center rib likewise decreases with increasing distance from the surface of the tread in a direction towards the axis of the tire. This preserves a desirable groove configuration that does not tend to trap foreign objects while providing an advantageous rib configuration that prolongs tread life, particularly when the tire is of the radial-carcass type and is used on heavy vehicles.

4 Claims, 3 Drawing Figures

TIRE TREAD WITH PROTRUDING ELEMENTS BETWEEN ADJACENT RIBS

BACKGROUND OF THE INVENTION

This invention relates to pneumatic tires and, more particularly, to novel and highly-effective pneumatic tires of the radial carcass type having an improved tread structure and adapted for heavy vehicles (trucks, buses, etc.).

Radial tires for heavy motor vehicles are generally provided with treads which are cut into circumferential ribs by means of zigzag circumferential grooves, generally four in number. It has been found that this type of radial tire tread, as a result of prolonged rapid travel on highways, experiences a very special form of wear. Superimposed on the two central zigzag grooves, there are formed two furrows which are wider but shallower than the grooves and which start to form at the protruding points of the ribs and gradually propagate themselves circumferentially. One solution to this problem is provided by an invention covered in my copending U.S. Pat. No. application Ser. No. 46,282, filed June 15, 1970, now U.S. Pat. No. 3,664,402, for "Tread for Heavy-Duty Radial-Carcass Tire."

SUMMARY OF THE INVENTION

An object of the present invention is to provide a tire of the radial-carcass type for heavy vehicles wherein the undesirable furrow wear described above is prevented. Another object of the invention is to provide a solution alternative to the one covered in my copending application identified above.

The foregoing and other objects are attained in accordance with the invention by the provision of a tire of the radial-carcass type having a tread comprising in its central portion at least one zigzag circumferential rib bordered by two circumferential zigzag grooves. The width of the center rib decreases from the surface of the tread towards the axis of the tire, and the width of the grooves also decreases towards the axis of the tire because of the presence, in the space between the center rib and the adjacent ribs, of protruding elements separated from the center rib by cuts.

The furrow wear of a rib is greatly attenuated when the width of the rib increases in the direction towards the surface of the tread. In order to assure this increase in width, it is desirable to impart to the sidewalls of the rib an inclination of 10° to 20° to the normal to the tread. However, it is undesirable for the sidewalls of a rib, and therefore of the adjacent grooves, to be inclined in such a manner that the width of the grooves decreases in the direction towards the surface of the tread. Such an arrangement, in fact, favors the retention of stones and foreign bodies in the grooves. In order to avoid this drawback, it is advisable to maintain for the groove a shape that flares with increasing distance along radii of the tire, although the space between adjacent grooves has a shape that flares with decreasing distance along radii of the tire, by providing protruding elements at the bottom of the space between the ribs. The angle of flare of the grooves should be within the range of 10° to 30°.

The arrangement in accordance with the invention may be used solely in the regions of the protruding angles of the central rib or ribs. However, it is simpler to use it over the entire peripheral development of the circumferential ribs and grooves. The cross-section of the ribs and grooves may be uniform or may vary along the periphery of the tire. Here also a uniform cross-section is a simpler solution.

BRIEF DESCRIPTION OF THE DRAWING

An understanding of other aspects of the invention can be gained from a consideration of the following detailed description of the preferred embodiments thereof, in conjunction with the appended figures of the drawing, wherein.

DESCRIPTION OF THE PREFERRED EMBODIMENTS

Figure 1:
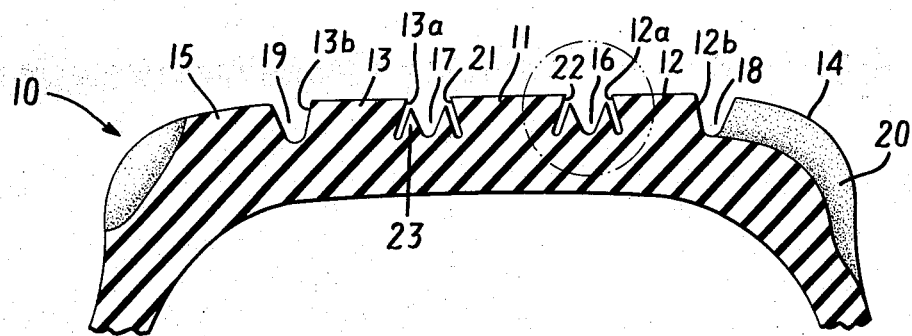
FIG. 1 is a fragmentary view in radial section of a tire having a tread in accordance with the invention.
Figure 3:
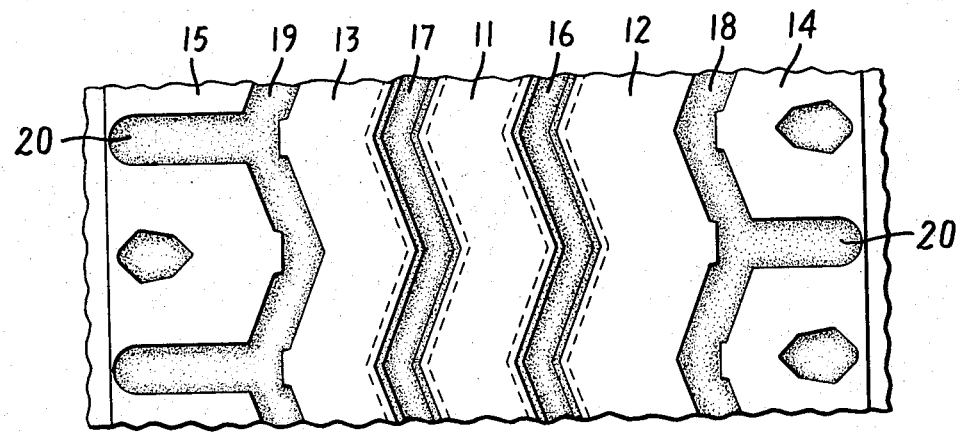
FIG. 3 is a plan view of a portion of the same tread corresponding to the length of one zigzag.

FIGS. 1 and 3 show a tread 10 which has a central circumferential zigzag rib 11, two median circumferential zigzag ribs 12 and 13 which are also continuous in the circumferential direction, and two discontinuous lateral circumferential ribs 14 and 15. These ribs are separated from one another by two central circumferential grooves 16 and 17 and two lateral circumferential grooves 18 and 19 having transverse extensions 20.

Figure 2:
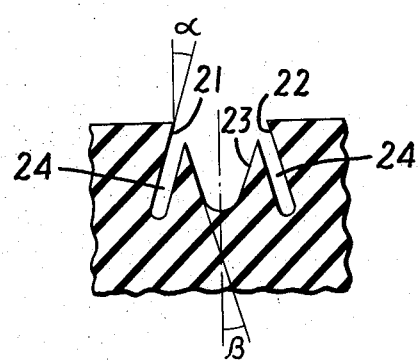
FIG. 2 is a view in radial section on a larger scale of the part surrounded by a circle in FIG. 1.

As the figures show, the central rib 11 has sidewalls 21 and 22 that are undercut so that the rib 11 has a width which decreases in the direction away from the surface of the tread towards the axis of the tire. That is, the sidewalls 21 and 22 converge towards the inside of the tire and form an angle $\alpha$ of 15° with the normal to the tread. The central grooves 16 and 17 have, however, a cross-section that flares (spreads out or becomes larger) with increasing distance along radii of the tire. Within the space between the central rib 11 and each of the median ribs 12 and 13 there are protruding elements 23 separated from the ribs 11, 12 or 13 by cuts 24 (FIG. 2). These elements have a shape such that the central grooves 16 and 17 have a cross-section substantially similar to that of the lateral grooves 18 and 19 with an inclination of the walls to the normal to the tread of about 20° (angle $\beta$, FIG. 2).

The sidewalls 12a and 13a of the ribs 12 and 13, respectively, which face towards the center rib 11, are undercut, just as are the sidewalls 21 and 22 of the rib 11. On the other hand, neither of the sidewalls 12b and 13b, which face away from the center rib 11, is undercut.

Thus there is provided in accordance with the invention a novel and highly effective tire of the radial-carcass type which is adapted for use on heavy vehicles and which does not exhibit the special form of wear that those skilled in the art have come to expect. Many modifications of the preferred embodiments of the invention described herein will readily occur to those skilled in the art upon study of this disclosure. For example, one can within the scope of the invention optionally provide a protruding element on one side in the space between adjacent ribs and not the other. Also, there may be two ribs which are equally "central" (for example, where the ribs are unevenly spaced or where an even number of ribs is provided), and in that case the structure characteristic of the "center" rib may apply to either or both of such ribs. Accordingly, the invention is to be construed as including all the em-

I claim:

1. A tire comprising a tread, said tread being formed with at least three circumferential ribs including, in its central portion, at least one zigzag circumferential center rib, and with at least two zigzag circumferential grooves, one on either side of said center rib, further comprising, between said center rib and the ribs adjacent thereto, protruding elements each separated from at least one of said ribs by a cut, said center rib being formed with undercut sidewalls so that the width of said center rib decreases with increasing distance from the surface of said tread in a direction towards the axis of said tire, and the width of said grooves, by virtue of said protruding elements, likewise decreasing with increasing distance from the surface of said tread in a direction towards the axis of said tire.

2. A tire according to claim 1 wherein said undercut sidewalls of said center rib are inclined by an angle of 10° to 20° with respect to the normal to said tread.

3. A tire according to claim 1 wherein said grooves are formed with sidewalls inclined by an angle of 10° to 30° with respect to the normal to said tread.

4. A tire according to claim 1 wherein each of said ribs in addition to said center rib is formed with a sidewall facing towards said center rib and a sidewall facing away from said center rib, each of said sidewalls facing towards said center rib being undercut, and neither of said sidewalls facing away from said center rib being undercut.

* * * * *